(12) United States Patent
Hikosaka

(10) Patent No.: US 7,529,106 B2
(45) Date of Patent: May 5, 2009

(54) VOLTAGE MONITORING DEVICE AND INVERTER DEVICE

(75) Inventor: Masatoshi Hikosaka, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 317 days.

(21) Appl. No.: 11/202,761

(22) Filed: Aug. 12, 2005

(65) Prior Publication Data

US 2007/0035972 A1  Feb. 15, 2007

(51) Int. Cl.
  *H02M 1/12* (2006.01)
(52) U.S. Cl. .............................. 363/44; 363/46; 363/17
(58) Field of Classification Search .................. 363/44, 363/45, 46, 47, 81, 84, 86, 17
  See application file for complete search history.

(56) References Cited

U.S. PATENT DOCUMENTS

| | | | | |
|---|---|---|---|---|
| 4,849,950 A | * | 7/1989 | Sugiura et al. ................ | 363/48 |
| 5,625,539 A | * | 4/1997 | Nakata et al. ................. | 363/17 |
| 5,771,164 A | * | 6/1998 | Murai et al. ................... | 363/89 |
| 6,021,052 A | * | 2/2000 | Unger et al. .................. | 363/26 |
| 6,115,266 A | * | 9/2000 | Matsui et al. ............ | 363/21.13 |
| 6,151,228 A | * | 11/2000 | Miyazaki et al. .............. | 363/48 |
| 6,166,932 A | * | 12/2000 | Otoshi ..................... | 363/56.03 |
| 6,272,030 B1 | * | 8/2001 | Oomura ....................... | 363/62 |
| 6,639,810 B2 | * | 10/2003 | Shimizu et al. ............... | 363/16 |
| 6,661,684 B2 | * | 12/2003 | Morita ........................ | 363/89 |
| 6,678,173 B2 | * | 1/2004 | Nakagawa ................... | 363/44 |
| 7,042,745 B1 | * | 5/2006 | Chen .......................... | 363/144 |
| 7,222,694 B2 | * | 5/2007 | Toda et al. ................... | 180/444 |

FOREIGN PATENT DOCUMENTS

| JP | 5-68338 | 3/1993 |
|---|---|---|
| JP | 5-55435 | 7/1993 |

* cited by examiner

*Primary Examiner*—Jessica Han
*Assistant Examiner*—Emily Pham
(74) *Attorney, Agent, or Firm*—Locke Lord Bissell & Liddell, LLP

(57) ABSTRACT

A voltage monitoring device 30 includes an AC input portion 31, a rectifier circuit 32, and a detection circuit 33. The AC input portion 31 receives alternating current output from a DC-AC inverter unit 13. The rectifier circuit 32 rectifies the alternating current received at the AC input portion 31. The rectifier circuit 32 is formed by a full-wave rectifier circuit. The detection circuit 33 detects the output voltage of the rectifier circuit 32. The detection circuit 33 includes a differential amplifier circuit 34. First and second capacitors C1 and C2 are respectively connected to two wires 36a and 36b, which connect the AC input portion 31 and the rectifier circuit 32. The capacitors C1 and C2 are set to have the same capacitance.

9 Claims, 2 Drawing Sheets

VOLTAGE MONITORING DEVICE AND INVERTER DEVICE

BACKGROUND OF THE INVENTION

The present invention relates to a voltage monitoring device for monitoring voltage of a primary-side circuit from a secondary-side circuit or monitoring voltage of the secondary-side circuit from the primary-side circuit while maintaining electric insulation between the primary-side and secondary-side circuits, which have different voltages, and to an inverter device.

There are electric devices provided with a primary-side circuit and a secondary-side circuit having different voltages. A semiconductor such as a photocoupler or an electromagnetic component such as a transformer are used to maintain electric insulation between the primary-side and secondary-side circuits when monitoring the primary-side voltage from the secondary-side or monitoring the secondary-side voltage from the primary-side.

Japanese Laid-Open Patent Publication 5-68338, for example, describes an electronic device incorporating a remote-controllable power supply unit that maintains the electric insulation between a circuit connected to the primary-side of the power supply unit and a circuit connected to the secondary-side of the power supply unit. The electronic device is provided with a power supply unit for generating DC voltage from a commercial AC power supply. The power supply unit has a remote control circuit located at its primary-side. The remote control circuit performs remote control based on an external control signal indicating whether or not DC voltage is output from the secondary-side. An electronic circuit and a system control circuit, which is operated by output voltage of the power supply unit, are arranged at the secondary-side of the power supply unit. Operation of the electronic circuit is controlled by the remote control circuit and the system control circuit. A photocoupler is arranged in a signal transmission channel between the remote control circuit and the system control circuit to function as a means for insulating the two circuits.

Japanese Laid-Open Utility-Model Publication 5-55435 describes a status detection circuit for an output switch arranged in a load circuit. The opening and closing of the output switch is controlled by a control unit, which is insulated from the output switch. The status detection circuit includes an insulating transformer, the secondary-side of which is closed when the output switch opens the load circuit, an oscillation circuit, which applies an oscillation output to the primary-side of the insulating transformer, a current detection means, which detects the primary-side current of the insulating transformer, and a determination means, which determines whether the output switch is open or closed based on the current detected by the current detection means.

It is difficult to design a circuit without using an insulative component, such as a photocoupler or a transformer, to maintain electric insulation between a primary-side and secondary-side. However, the use of an insulative component, such as a photocoupler or transformer, increases costs.

SUMMARY OF THE INVENTION

It is an object of the present invention to enable monitoring of the primary-side voltage from the secondary-side or monitoring of the secondary-side voltage from the primary-side while maintaining electric insulation between the primary and secondary-sides by using passive components, such as a capacitor and a resistor, without using any electric insulative components, such as a photocoupler or a transformer.

To achieve the above object, the present invention includes an AC input portion, a rectifier circuit for rectifying alternating current received at the AC input portion, two wires connecting the AC input portion and the rectifier circuit, first and second capacitors respectively connected to the two wires, and a detection circuit for detecting output voltage of the rectifier circuit.

The present invention also provides an inverter device that enables the secondary-side voltage to be monitored from the primary-side without using any electric insulative components, such as a photocoupler or a transformer. The inverter device includes a plurality of switching devices, a control unit for controlling the switching devices, and a voltage monitoring device for monitoring alternating current output from the DC-AC inverter unit. The voltage monitoring device includes an AC input portion for receiving the alternating current output from the DC-AC inverter unit, a rectifier circuit for rectifying the alternating current received from the AC input portion, two wires connecting the AC input portion and the rectifier circuit, first and second capacitors respectively connected to the two wires, and a detection circuit for detecting the output voltage of the rectifier circuit.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

A voltage monitoring device for an on-vehicle inverter device according to a first embodiment of the present invention will now be described.

Figure 1:
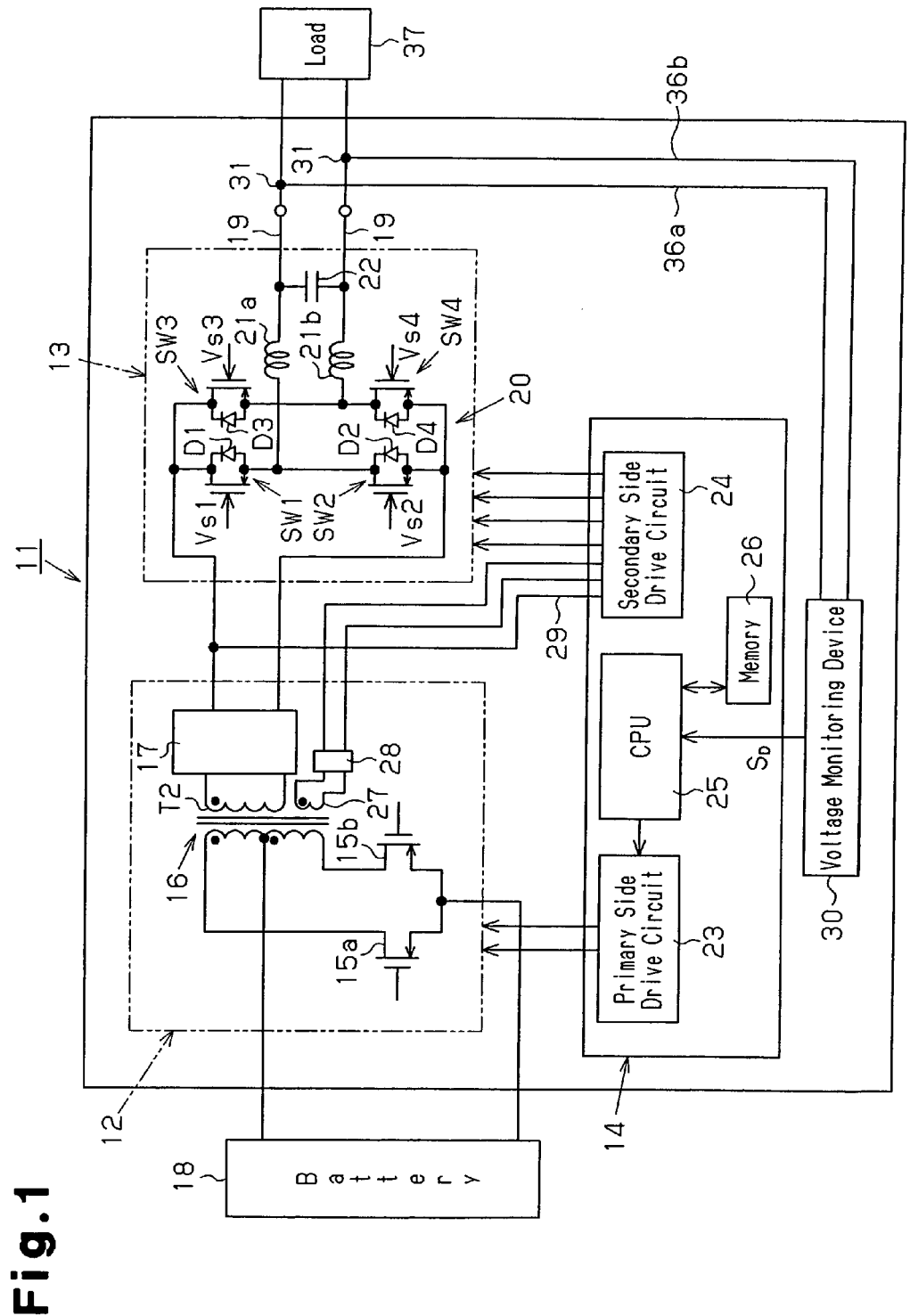
FIG. 1 is a block circuit diagram illustrating an inverter device and a voltage monitoring device according to a first embodiment of the present invention.

As shown in FIG. 1, an inverter device 11, which functions as a switching power supply, includes a DC-DC converter 12, a DC-AC inverter unit 13, and a controller 14. The DC-DC converter 12 includes a pair of switching devices 15a and 15b, a booster transformer 16, and a rectifier circuit 17. The DC-DC converter 12 is connected, at the primary-side of the booster transformer 16, to a power supply, that is, a battery 18 mounted on a vehicle, and converts the battery voltage to a DC voltage higher than the battery voltage. The switching devices 15a and 15b are each formed by an n-channel MOSFET. The booster transformer 16 has its primary-side (input side) insulated from its secondary-side (output-side). In other words, the inverter device 11 is an insulative type inverter.

The DC-AC inverter unit 13 is connected to the secondary-side, or the output-side, of the DC-DC converter 12 to convert DC current supplied from the DC-DC converter 12 to an AC voltage of 60 Hz and 120 V and output the AC voltage to output terminals 19. In other words, the inverter device 11 forms an AC inverter, which converts alternating current to direct current and outputs the direct current. The DC-AC inverter unit 13 includes an H-bridge circuit 20 configured by four switching device SW1 to SW4. Each of the switching devices SW1 to SW4 is formed by an n-channel MOSFET. The first and third switching devices SW1 and SW3 of the H-bridge circuit 20 are connected to the positive terminal of the rectifier circuit 17, and the second and fourth switching devices SW2 and SW4 are connected to the negative terminal of rectifier circuit 17. The switching devices SW1, SW2, SW3, and SW4 are connected in reverse parallel to diodes D1, D2, D3, and D4, respectively. The H-bridge circuit 20 is connected to a capacitor 22 and coils (reactors) 21a and 21b, which form a filter in the output of the H-bridge circuit 20.

The controller 14 includes a primary-side drive circuit 23, a secondary-side drive circuit 24, a CPU 25, and a memory 26. The memory 26 stores a control program for controlling the DC-DC converter 12. The controller 14 controls the DC-DC converter 12 with the primary-side drive circuit 23 and controls the DC-AC inverter unit 13 with the secondary-side drive circuit 24.

The secondary-side drive circuit 24 is supplied with power via a rectifier circuit 28 connected to a tertiary winding 27 arranged at the secondary-side of the booster transformer 16. Usually, in order to stop the alternating current output from the inverter device 11, the drive signal provided from the CPU 25 to the primary-side drive circuit 23 is inactivated to inactivate both of the switching devices 15a and 15b. As a result, the voltage generated in the tertiary winding 27 is nullified and the power supply to the secondary-side drive circuit 24 is stopped. This stops the output of the drive signal from the secondary-side drive circuit 24 and stops the output from the DC-AC inverter unit 13.

Drive signals Vs1 and Vs3 output from the secondary-side drive circuit 24 are respectively received by control terminals (MOSFET gates in this embodiment) of the first and third switching devices SW1 and SW3. Drive signals Vs2 and Vs4 output from the secondary-side drive circuit 24 are respectively received by control terminals of the second and fourth switching devices SW2 and SW4. The secondary-side drive circuit 24 generates and outputs the first to fourth drive signals Vs1 to Vs4 to the switching devices SW1 to SW4 such that the pair of switching devices SW1 and SW4 and the pair of the switching devices SW2 and SW3 are alternately activated and inactivated in correspondence with the commercial AC frequency of 60 Hz.

The secondary-side drive circuit 24 is connected to the positive-side output terminal of the rectifier circuit 17 via a wire 29 to detect the output voltage of the rectifier circuit 17. The secondary-side drive circuit 24 detects the output voltage of the rectifier circuit 17 with a sensor (not shown) and adjusts the on duty of the switching devices SW1 to SW4. When the output voltage of the rectifier circuit 17 becomes high, the secondary-side drive circuit 24 controls the switching devices SW1 to SW4 so as to decrease the on duty of the switching devices SW1 to SW4 so that the effective value of the AC voltage output to the output terminals 19 reaches a predetermined value. However, if the rectifier circuit 17 outputs a voltage higher than a predetermined threshold voltage, the secondary-side drive circuit 24 generates first to fourth drive signals Vs1 to Vs4 so as to inactivate the switching devices SW1 to SW4 and outputs the drive signals to the switching devices SW1 to SW4. In other words, when an abnormality occurs, the drive signals Vs1 to Vs4 from the secondary-side drive circuit 24 are inactivated to stop the alternating current output from the inverter device 11.

Figure 2:
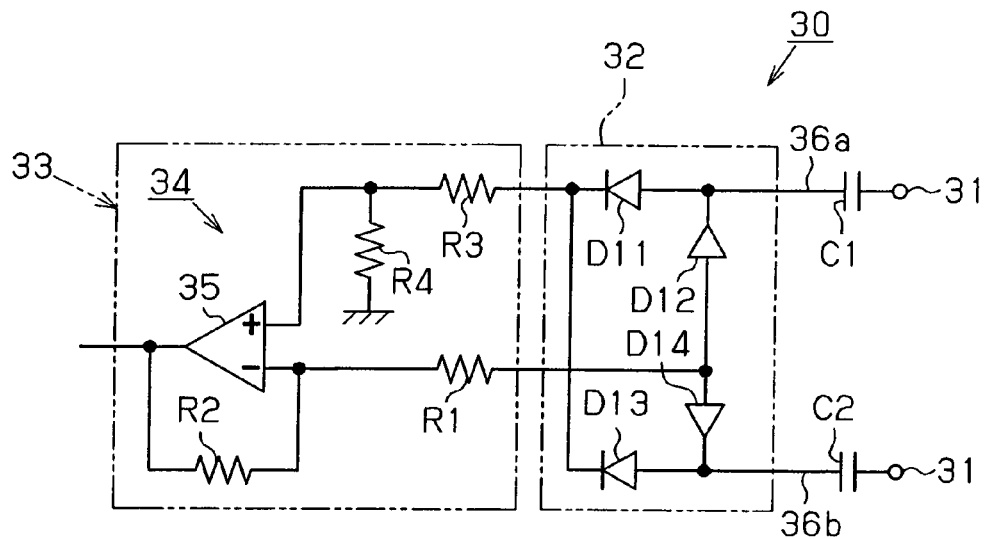
FIG. 2 is a circuit diagram illustrating the voltage monitoring device.

The inverter device 11 includes a voltage monitoring device 30 for monitoring the output voltage at the output terminals 19. As shown in FIG. 2, the voltage monitoring device 30 includes AC input portions 31, a rectifier circuit 32, and a detection circuit 33. The AC input portions 31 are each connected to one of the output terminals 19 to receive the alternating current output from the DC-AC inverter unit 13. The rectifier circuit 32 rectifies the alternating current received at the AC input portions 31. The rectifier circuit 32 is formed by a full-wave rectifier circuit. A bridge rectifier circuit, which includes four connected diodes D11, D12, D13, and D14, is used as the full-wave rectifier circuit.

The detection circuit 33 detects the output voltage from the rectifier circuit 32. The detection circuit 33 includes a differential amplifier circuit 34. The differential amplifier circuit 34 includes an operational amplifier 35, a resistor R1 connected to the inverting input terminal of the operational amplifier 35, a resistor R2 connected between the inverting input terminal and the output terminal of the operational amplifier 35, and resistors R3 and R4 connected to the non-inverting input terminal of the operational amplifier 35. The resistances of the resistors R1 and R3 are set to the same value, and the resistances of the resistors R2 and R4 are set to the same value. Accordingly, the differential amplifier circuit 34 outputs a voltage obtained by multiplying the difference in voltage between the output terminals 19 by R2/R1. Here, R2/R1 represents the ratio of the resistance of the resistor R2 to the resistance of the resistor R1. For example, when the resistance of the resistor R1 is set to 20 times the resistance of the resistor R2, the differential amplifier circuit 34 outputs voltage obtained by multiplying the difference in voltage between the output terminals 19 by 1/20.

The rectifier circuit 32 is connected to the AC input portions 31 by two wires 36a and 36b. First and second capacitors C1 and C2 are connected to the wires 36a and 36b, respectively. The capacitors C1 and C2 are set to have the same capacitance.

The CPU 25 is provided with a detection signal $S_D$ from the detection circuit 33, or an output signal from the differential amplifier circuit 34. The CPU 25 monitors the secondary-side voltage of the inverter device 11, or the voltage at the AC input portions 31, with the detection signal from the detection circuit 33. In other words, the voltage monitoring device 30 monitors alternating current output from an AC-inverter, which converts direct current input into alternating current output, from the DC side. When determining that the voltage at the AC input portions 31, or the AC output voltage of the DC-AC inverter unit 13, is lower than a predetermined threshold based on the detection signal $S_D$ from the detection circuit 33, the CPU 25 inactivates the drive signal sent to the primary-side drive circuit 23.

The operation of the inverter device 11 will now be described.

When the inverter device 11 is activated, the CPU 25 controls the switching devices 15a and 15b to alternately activate and inactivate the primary-side drive circuit 23. This generates AC voltage that is greater than the voltage of the battery 18 in the secondary winding T2 of the booster transformer 16. The AC voltage is converted into DC voltage that is greater than the voltage of the battery 18 by the rectifier circuit 17.

The switching devices SW1 to SW4 of the H-bridge circuit 20 of the DC-AC inverter unit 13 are controlled by the secondary-side drive circuit 24. That is, the pair of switching devices SW1 and SW4 and the pair of switching devices SW2 and SW3 are alternately activated and inactivated at the cycle of the commercial AC frequency of 60 Hz.

Figure 4:
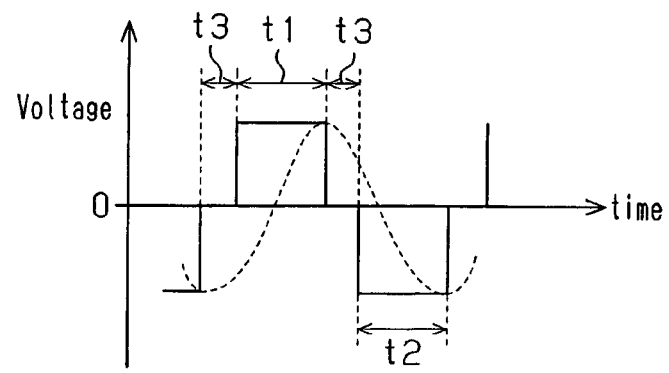
FIG. 4 is a schematic diagram showing the relationship between the ON and OFF periods of a switching device and the waveform of the output voltage.

More specifically, as shown in FIG. 4, the secondary-side drive circuit 24 outputs first to fourth drive signals Vs1 to Vs4 such that period t1, in which the switching devices SW1 and SW4 are activated, and period t2, in which the switching devices SW2 and SW3 are activated, are repeated in an interval of period t3. That is, the switching devices SW1 to SW4 repeat operations as shown in Table 1 below in each period.

TABLE 1

|           | SW1 | SW2 | SW3 | SW4 |
|-----------|-----|-----|-----|-----|
| Period t1 | ON  | OFF | OFF | ON  |
| Period t2 | OFF | ON  | ON  | OFF |
| Period t3 | OFF | OFF | OFF | OFF |

A harmonic component included in the waves output from the H-bridge circuit 20 is eliminated by the coils 21a and 21b and capacitor 22, which form a filter. The waves are then output from the output terminals 19 as shown by the broken line in FIG. 4. As a result, the DC voltage supplied from the rectifier circuit 17 is converted into an alternating current of 60 Hz and 120 V and supplied to a load device 37 connected to the output terminals 19.

The CPU 25 receives a detection signal from the detection circuit 33 to monitor the output voltage of the DC-AC inverter unit 13 based on the detection signal. The two wires 36a and 36b, which connect the AC input portions 31 and the rectifier circuit 32, are respectively connected to the first and second capacitors C1 and C2. Therefore, the primary-side, or the CPU 25 side, is electrically insulated from the secondary-side, or the output-side of the DC-AC inverter unit 13, by the first and second capacitors C1 and C2.

If the output from the output terminals 19 is a direct current, no current will flow to the rectifier circuit 32 beyond the first and second capacitors C1 and C2 of the voltage monitoring device 30. However, since the output from the output terminals 19 is an alternating current, the first and second capacitors C1 and C2 are repeatedly charged and discharged so that alternating current flows to the rectifier circuit 32. The rectifier circuit 32 rectifies alternating current to direct current, which flows to the detection circuit 33.

When the voltage at the AC input portions 31 becomes less than the predetermined threshold, the CPU 25 inactivates the drive signal provided to the primary-side drive circuit 23 based on the detection signal SD from the detection circuit 33 in the voltage monitoring device 30. The voltage at the AC input portions 31 becomes less than the predetermined if the load of the load device 37 is too high. Therefore, the switching devices SW1 to SW4 are inactivated so that the output voltage of the DC-AC inverter unit 13 becomes less than the predetermined threshold. When detecting such low voltage with the detection circuit 33, the CPU 25 inactivates the drive signal provided to the primary-side drive circuit 23. As a result, the switching devices 15a and 15b are both inactivated to nullify the voltage that has been generated at the tertiary winding 27 and stop the supply of power to the secondary-side drive circuit 24.

This embodiment has the advantages described below.

(1) The voltage monitoring device 30 includes the AC input portions 31, the rectifier circuit 32 for rectifying alternating current received at the AC input portions 31, the two wires 36a and 36b connecting the AC input portions 31 and the rectifier circuit 32, the first and second capacitors C1 and C2 respectively connected to the wires 36a and 36b, and the detection circuit 33 for detecting the output voltage of the rectifier circuit 32. This enables the monitoring of the secondary-side voltage from the primary-side while maintaining electric insulation between the primary and secondary-sides by using only passive components and without using any electric insulative component, such as a photocoupler or transformer.

(2) The detection circuit 33 includes the differential amplifier circuit 34. Even if the secondary-side voltage is 10 to 20 times higher than the primary-side voltage, the secondary-side voltage is monitored without any problems by setting the amplification factor of the differential amplifier circuit 34 such that the output voltage of the differential amplifier circuit 34 is appropriate for detection at the primary-side.

(3) The rectifier circuit 32 is formed by a full-wave rectifier circuit. Therefore, the detection accuracy is higher than when the rectifier circuit 32 is formed by a half-wave rectifier circuit.

(4) The AC input portions 31 input to the voltage monitoring device 30 the alternating current output from the DC-AC inverter unit 13, which converts direct current to alternating current and then outputs the alternating current. Therefore, the alternating current output from the inverter device 11 is efficiently monitored with a simple configuration.

(5) The voltage monitoring device 30 monitors the alternating current output of the inverter device 11 from the DC side of the inverter device 11, which converts direct current into alternating current and then outputs the alternating current. Accordingly, the configuration is simplified when the AC output voltage (secondary-side voltage) is monitored by the CPU 25, which is at the primary-side of the inverter device 11, with the voltage monitoring device 30.

Figure 3:
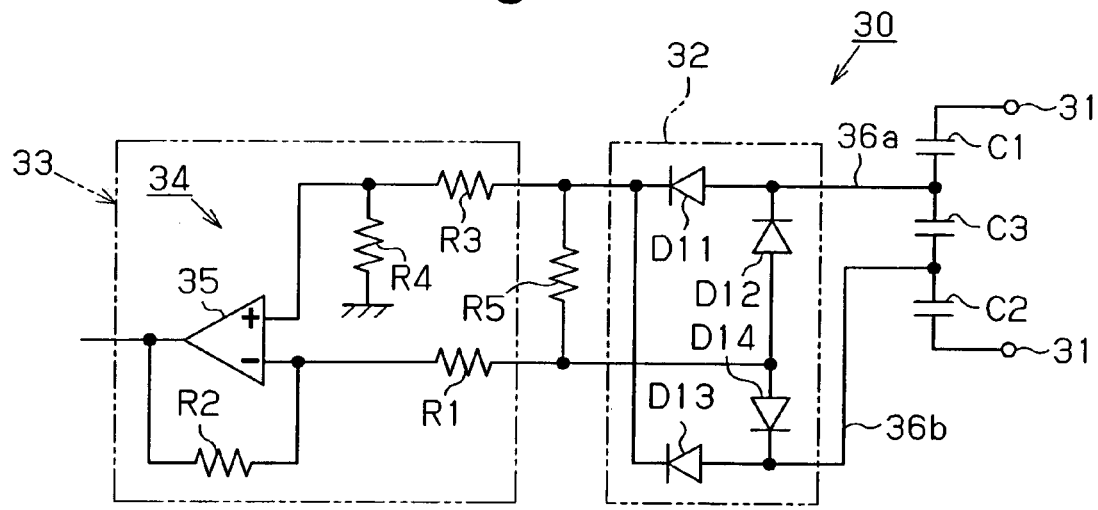
FIG. 3 is a circuit diagram illustrating a voltage monitoring device according to a second embodiment of the present invention.

Referring to FIG. 3, a second embodiment of the present invention will now be described focusing on features differing from the first embodiment.

As shown in FIG. 3, in the voltage monitoring device 30 of this embodiment, a third capacitor C3 is connected in parallel between the first wire 36a and the second wire 36b. Further, a resistor R5 is connected between the rectifier circuit 32 and the differential amplifier circuit 34 in parallel with the rectifier circuit 32 and the differential amplifier circuit 34. The resistor R5 functions to accelerate discharge from the third capacitor C3.

In the voltage monitoring device 30 of the second embodiment as well as in the voltage monitoring device 30 of the first embodiment, the first and second capacitors C1 and C2 are repeatedly charged and discharged by alternating current output from the output terminals 19 so that alternating current flows to the rectifier circuit 32. The alternating current is then rectified by the rectifier circuit 32 into direct current that flows to the detection circuit 33. Accordingly, the secondary-side voltage is monitored from the primary-side while maintaining electric insulation between the primary-side and the secondary-side by using only passive components and without using any electric insulative components such as a photocoupler or transformer. The second embodiment has the same advantages as advantages (2) to (5) of the first embodiment. The resistor R5 may be omitted.

In the second embodiment, the third capacitor C3 is connected between the first wire 36a and the second wire 36b. However, instead of the third capacitor C3, a resistor may be provided between the first and second capacitors C1 and C2 and the rectifier circuit 32. In such a configuration, the resistor R5 shown in FIG. 3 is not necessary.

In the embodiments described above, the two wires 36a and 36b, which connect the AC input portions 31 and the rectifier circuit 32, are respectively connected to the first and second capacitors C1 and C2. However, the wires 36a and 36b may be each provided with a plurality of capacitors. In this case, the capacitance of each capacitor is set such that the total capacitance of the capacitors connected to each of the wires 36a and 36b is equal.

The inverter device 11 does not necessarily have to convert direct current provided by the battery 18 to DC voltage that is greater than the battery voltage with the DC-DC converter 12 and then convert the DC voltage supplied by the DC-DC converter 12 to AC voltage with the DC-AC inverter unit 13. For example, the DC-DC converter 12 may be omitted. In this case, direct current supplied from the battery 18 may be directly converted to alternating current by the DC-AC inverter unit 13, and then the voltage of the AC current may be increased by a transformer to a predetermined voltage (e.g., 120 V) before being output from the output terminals 19.

The switching devices SW1 to SW4 forming the H-bridge circuit 20 may be switching devices other than n-channel MOSFETs. For example, they may be IGBTs (Insulated Gate Bipolar Transistors).

The amplitude of the AC voltage output by the DC-AC inverter unit 13 is not limited to 120 V but may be any other AC voltage used in consumer electric appliances (e.g., 100 V, 110 V, or 200 V). Further, the frequency of alternating current may be 50 Hz instead of 60 Hz.

The rectifier circuit 32 need not necessarily be a full-wave rectifier circuit but may be a half-wave rectifier circuit.

The voltage monitoring device 30 may be formed such that the differential amplifier circuit 34 is eliminated and the CPU 25 receives the output from the rectifier circuit 32 through an A/D converter. In this case, the CPU 25 functions as the detection circuit.

The voltage monitoring device 30 is applicable not only to an on-vehicle inverter device 11 but also to any other inverter devices.

The voltage monitoring device 30 does not necessarily have to monitor the secondary-side voltage from the primary-side while maintaining electric insulation between the primary-side circuit and secondary-side circuit, which have different voltages. For example, if the primary-side has an AC voltage, the primary-side voltage may be monitored from the secondary-side.

The voltage monitoring device 30 is applicable not only to a case in which one of the primary-side and secondary-side circuits has a DC voltage and the other has an AC voltage but also to a case in which both the primary-side and secondary-side circuits both have an AC voltage.

The H-bridge circuit 20 does not have to be controlled by alternately activating and inactivating the set of switching devices SW1 and SW4 and the set of switching devices SW2 and SW3 to convert the DC voltage to an AC voltage so as to output a sinusoidal AC voltage from the output terminals 19. For example, one cycle of commercial alternating current having 60 Hz may be divided into a first half cycle and a second half cycle. During the first half cycle, the switching device SW1 is kept inactivated while the switching device SW2 is kept activated, and the switching devices SW3 and SW4 are alternately activated and inactivated at a predetermined control frequency (20 to 40 kHz). During the second half cycle, the switching device SW3 is kept inactivated while the switching device SW4 is kept activated, and the switching devices SW1 and SW2 are alternately activated and inactivated at a predetermined control frequency (20 to 40 kHz). The first and second half cycles are repeated in this manner. A sinusoidal AC voltage is output to the output terminals 19 by adjusting the on duty of the switching device SW3 during the first half cycle and the on duty of the switching device SW1 during the second half cycle so as to obtain a target voltage.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A power converter device having a primary-side circuit and a secondary-side circuit, the primary-side circuit being insulated from the secondary-side circuit, the power converter device comprising:
 a voltage monitoring device for monitoring voltage output from the secondary-side circuit, the voltage monitoring device including:
  an AC input portion having a first terminal and a second terminal each connected to a first output port and a second output port of the secondary-side circuit that output alternating current;
  a rectifier circuit having a third terminal and fourth terminal for rectifying the alternating current received at the AC input portion, wherein the rectifier circuit is connected to the first terminal and the second terminal of the AC input portion via the third terminal and the fourth terminal of the rectifier circuit, respectively; and
  a detection circuit for detecting output voltage of the rectifier circuit and generating a control signal that controls the primary-side circuit,
  wherein the first terminal of the AC input portion and the first output port of the secondary-side circuit is connected via a first capacitor, and the second terminal of the AC input portion and the second output port of the secondary-side circuit is connected via a second capacitor thereby preventing a direct current from flowing into the AC input portion.

2. The power converter device according to claim 1, wherein the detection circuit includes a differential amplifier circuit.

3. The power converter device according to claim 1, wherein the rectifier circuit is a full-wave rectifier circuit.

4. The power converter device according to claim 1, wherein a third capacitor is connected between the first capacitor and the second capacitor.

5. The power converter device according to claim 1, wherein the primary-side circuit has a plurality of switching elements that are controlled in response to monitoring results obtained by the voltage monitoring device.

6. The power converter device according to claim 1, wherein the power converter device is an inverter device that converts direct current to alternating current and outputs the alternating current.

7. The power converter device according to claim 5, wherein the alternating current output of the inverter device is monitored from the direct current side.

8. The power converter device according to claim 6, wherein the inverter device is an insulating type inverter including a transformer.

9. An inverter device for converting battery voltage supplied from a battery to AC voltage required by a load device and outputting the AC voltage, wherein the inverter device has a primary-side circuit and a secondary-side circuit, the primary-side circuit being insulated from the secondary-side circuit, the inverter device further comprising:

a DC-AC inverter unit including a plurality of switching devices, the DC-AC inverter unit forming the secondary-side circuit;

a control unit for controlling the switching devices; and a voltage monitoring device for monitoring alternating current output from the secondary-side circuit, the voltage monitoring device including:

an AC input portion having a first terminal and a second terminal for receiving the alternating current output from the secondary-side circuit;

a rectifier circuit having a third terminal and fourth terminal for rectifying the alternating current received from the AC input portion, wherein the rectifier circuit is connected to the first terminal and second terminal of the AC input portion via the third terminal and the fourth terminal; and a detection circuit for detecting the output voltage of the rectifier circuit and generating a control signal that controlsthe primary-side circuit, wherein the first terminal of the AC input portion and the first output port of the secondary-side circuit is connected via a first capacitor, and the second terminal of the AC input portion and the second output port of the secondary-side circuit is connected via a second capacitor thereby preventing a direct current from flowing into the AC input portion.

* * * * *